United States Patent [19]
Rich et al.

[11] Patent Number: 5,527,931
[45] Date of Patent: Jun. 18, 1996

[54] AQUEOUS DISPERSABLE OIL AND WATER REPELLENT SILANE MASONRY PENETRANTS

[75] Inventors: Larry D. Rich, Oakdale, Minn.; James F. Sanders, St. Joseph Township, St. Croix County, Wis.

[73] Assignee: Minnesota Mining and Manufacturing Company, St. Paul, Minn.

[21] Appl. No.: 266,116

[22] Filed: Jun. 27, 1994

Related U.S. Application Data

[63] Continuation of Ser. No. 854,480, Mar. 20, 1992.

[51] Int. Cl.$^6$ .................................................. C07F 7/10
[52] U.S. Cl. .......................... 556/413; 556/418; 556/419
[58] Field of Search .................................. 556/413, 418, 556/419

[56] References Cited

U.S. PATENT DOCUMENTS

| | | | |
|---|---|---|---|
| 3,427,366 | 2/1969 | Van Dyke Tiers | 260/448.2 |
| 3,442,664 | 5/1969 | Heine | 106/2 |
| 3,589,917 | 6/1971 | Hedlund | 106/12 |
| 3,598,515 | 8/1971 | Moore et al. | 8/115.6 |
| 3,666,538 | 5/1972 | Domba | 117/121 |
| 3,772,065 | 11/1973 | Seller | 117/123 |
| 3,849,357 | 11/1974 | Wolf | 260/29.6 |
| 3,879,206 | 4/1975 | Nestler et al. | 106/12 |
| 3,914,476 | 10/1975 | Nitzsche et al. | 427/337 |
| 3,955,985 | 5/1976 | Bosch et al. | 106/2 |
| 3,956,570 | 5/1976 | Bosch et al. | 428/446 |
| 4,031,282 | 6/1977 | McClinton | 428/141 |
| 4,073,972 | 2/1978 | Nestler et al. | 427/136 |
| 4,102,703 | 7/1978 | Tully | 106/287 |
| 4,195,010 | 3/1980 | Russell et al. | 260/40 |
| 4,209,432 | 6/1980 | Roth | 260/29.2 |
| 4,273,813 | 6/1981 | Meddaugh | 427/387 |
| 4,338,375 | 6/1982 | Hashimoto et al. | 428/412 |
| 4,342,796 | 8/1982 | Brown et al. | 427/136 |
| 4,352,894 | 10/1982 | Schmidt | 521/91 |
| 4,377,608 | 3/1983 | Daudt et al. | 427/350 |
| 4,413,102 | 11/1983 | Tanaka et al. | 525/453 |
| 4,433,013 | 2/1984 | Puhringer | 427/337 |
| 4,478,911 | 10/1984 | Price | 428/332 |
| 4,486,476 | 12/1984 | Fritsch et al. | 427/387 |
| 4,517,375 | 5/1985 | Schmidt | 556/463 |
| 4,525,213 | 6/1985 | Linn | 106/2 |
| 4,631,207 | 12/1986 | Price | 427/387 |
| 4,648,904 | 3/1987 | DePasquale et al. | 106/2 |
| 4,661,551 | 4/1987 | Mayer et al. | 524/379 |
| 4,717,599 | 1/1988 | Merrill | 427/387 |
| 4,741,773 | 5/1988 | Kuroda et al. | 106/2 |
| 4,753,977 | 6/1988 | Merrill | 524/588 |
| 4,786,531 | 11/1988 | Hodson | 427/387 |
| 4,846,886 | 7/1989 | Fey et al. | 106/2 |
| 4,873,306 | 10/1989 | Wabowsky et al. | 528/28 |
| 4,874,431 | 10/1989 | Fey et al. | 106/2 |
| 4,877,654 | 10/1989 | Wilson | 427/387 |
| 4,889,747 | 12/1989 | Wilson | 427/221 |
| 5,112,393 | 5/1992 | Engel et al. | 106/2 |
| 5,124,467 | 6/1992 | Rodgers et al. | 556/413 X |
| 5,162,559 | 11/1992 | Wilharm et al. | 556/413 X |
| 5,210,246 | 5/1993 | Tanaka et al. | 556/413 X |
| 5,250,106 | 10/1993 | Roth et al. | 106/2 |

FOREIGN PATENT DOCUMENTS

| | | |
|---|---|---|
| 2125609 | 6/1993 | France . |
| 2313987 | 7/1994 | France . |
| 59-140280 | 4/1993 | Japan . |

OTHER PUBLICATIONS

Chemical Abstracts, vol. 102, No. 16, 1985, abstract No. 136805y, "Surface Treatment Agents", p. 304.

Rapra Abstracts, vol. 10, No. 9, 26–Feb.–1973, abstract 11068L, "Fluorosiloxane Copolymers as Soil Release Agents".

Primary Examiner—Paul F. Shaver
Attorney, Agent, or Firm—Gary L. Griswold; Walter N. Kirn; Robert W. Sprague

[57] ABSTRACT

The present invention relates to organosilane compounds used for treating porous substrates to render them repellent to water-based and oil-based challenges and to enhance the cleanibility of the protected surfaces from such challenges.

22 Claims, No Drawings

AQUEOUS DISPERSABLE OIL AND WATER REPELLENT SILANE MASONRY PENETRANTS

This is a continuation of application No. 07/854,480 filed Mar. 20, 1992.

FIELD OF THE INVENTION

The present invention relates to organosilane compounds and more particularly, to organosilane compounds for treating porous substrates to render them repellent to water-based and oil-based challenges and to enhance the cleanability of the protected surfaces from such challenges.

BACKGROUND OF THE INVENTION

Porous substrates, including concrete, masonry and wood structures, are vulnerable to the general effects of weathering and specifically to exposure to water and oil. The weathering of concrete substantially shortens the useful life of structures such as highways, bridges, parking ramps and the like. Exposure of wood and masonry substrates to water and oil can also significantly shorten the useful life of the product and reduce its aesthetic appeal even before it is no longer functional. Such substrates are often sealed with a film-forming resin, such as an epoxy or urethane product. These coating materials are often quite expensive and may undesirably alter the appearance of the coated substrate. Such coatings also seal the product completely, preventing or greatly reducing the escape of moisture from the coated substrate.

Silane and siloxane compositions are commercially available to seal both wood and masonry substrates to provide protection against water damage, which are typically delivered from volatile organic solvents. These compositions are undesirable because of the adverse effects of the solvents upon the atmosphere and the resultant health problems associated with air pollution. For example, chlorinated hydrocarbon solvents have been shown to adversely effect the ozone layer. Other organic solvents such as aromatic solvents are undesirable because of their toxicity. Therefore, systems utilizing organic solvents are not desirable.

A number of water-dispersed or water-emulsified silane treatments have been developed in response to environmental concerns. Examples of such systems include those described in U.S. Pat. No. 4,648,904 to DePasquale, U.S. Pat. No. 4,517,375 to Schmidt and U.S. Pat. No. 4,661,551 to Mayer et al. DePasquale provides an aqueous emulsion of a hydrolyzable silane and an emulsifying agent having an hydrophilic-lipophilic balance (HLB) value from 4 to 15. Schmidt discloses aqueous impregnation solutions prepared from hydrolyzed alkyl trialkoxy silanes. Mayer et al. teach the use of a transparent organosilane composition which is easily dispersed in water to form a transparent microemulsion.

While providing ecological advantages over solvent-based treatments, these water-dispersed or water-emulsified silane materials have not been able to provide performance comparable to solvent delivered materials. Also, many of these silane/siloxane materials exhibit poor substrate penetration. Additionally, such silane materials may not exhibit oil repelling properties.

Silanes which contain fluorine, however, have been used as water and/or oil repelling agents in other applications such as oil repellents on automobile and aircraft windshields. For example, U.S. Pat. No. 3,427,336 to Tiers discloses the use of perfluorocarbon substituted organosilanes as oil, water and ketone repellents on glass. Similarly, U.S. Pat. No. 3,442,664 to Heine discloses an aircraft windshield treatment that contains a low molecular weight polymeric fluorine-containing organo-siloxane.

Thus, there currently exists a need for compounds which provide a satisfactory balance of water and oil repellency on porous substrates. More specifically, there exists a need for compounds which eliminate the adverse effects associated with solvent based treatments and which protect porous substrates from water, salt, waterborne chemicals, and oily stains such as motor oil or paints and paint films. In addition, there exists a need to apply this protection from an aqueous delivery system rather than from solvent.

SUMMARY OF INVENTION

The present invention provides for silane compounds comprising hydrophilic, hydrophobic, and oleophobic components which can effectively repel both water and oil based challenges and enhance the cleanability of a protected substrate. In addition, these silane compounds eliminate many of the adverse ecological impacts associated with solvent based systems.

In the treatment composition, these silane compounds preferably are a condensation product, in part, of distinct moieties having a hydrophobic, oleophobic and hydrophilic functionalities. The silane condensation product comprises a three dimensional molecular network which is derived from reactive precursors either as a mixture of precursors or as independently applied precursors which provides protection to a porous substrate and is represented by the following formula:

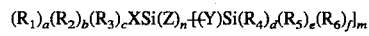

$$(R_1)_a(R_2)_b(R_3)_c XSi(Z)_n\text{-}[(Y)Si(R_4)_d(R_5)_e(R_6)_f]_m$$

where:

R$_1$ is a group containing at least one hydrophilic functionality;

R$_2$ is a group containing at least one hydrophobic functionality;

R$_3$ is a group containing at least one oleophobic functionality;

R$_4$ is a group containing at least one hydrophilic functionality;

R$_5$ is a group containing at least one hydrophobic functionality;

R$_6$ is a group containing at least one oleophobic functionality;

X is a connecting group which preferably contains at least one nitrogen.

Y is —O— or (R$_7$) (R$_8$) (SiO)$_q$ where q is 0, 1, 2 . . . ;

wherein R$_7$ and R$_8$ are selected from a lower alkyl, fluorinated lower alkyl or aromatic group(s);

Z is H, —OH or a moiety hydrolyzable to —OH;

r.. and n are 0, 1, 2, 3 and m+n=3;

a is 0, 1, 2, 3;

b is 0, 1, 2, 3;

c is 0, 1, 2, 3;

where m=0, a, b, c,≧1;

where m≧1, d is 0, 1, 2 . . . ;

e is 0, 1, 2 . . . ;

f is 0, 1, 2 . . . ;

a+b+c+d+e+f≧3, where a+d=1 or more;

b+e=1 or more; and c+f=1 or more.

For the purposes of this application, it should be understood that the groups ($R_1$–$R_6$) can be connected to X through another R moiety. For example, $R_1$ can be connected to X indirectly through $R_2$.

The present invention also includes delivering the compound as an aqueous dispersion. If desired, the compound can also be delivered as a neat material or diluted with a solvent.

The present invention further includes a method of treating the porous substrate with the compound.

DETAILED DESCRIPTION OF THE PRESENT INVENTION

The silane compounds of the present invention are condensation products of distinct moieties having hydrophobic, oleophobic and hydrophilic functionalities.

The X moiety is a connective group which provides a means to link the silicon atom(s) to the hydrophobic, oleophobic and/or hydrophilic containing groups. This connective group may be an aliphatic group, an aromatic group or an aliphatic group comprising a multi-ligand atom. Examples of suitable aliphatic groups include condensation products of polyols and representative examples of aromatic groups include phenyl, benzyl, and alkyl benzyl moieties. Preferably, X comprises one or more nitrogen-containing aliphatic groups. For example, the nitrogen-containing group can be an amine, which is linked to the hydrophilic, hydrophobic and/or oleophobic-containing group(s) by means, for example, of a Michael addition reaction between the amino nitrogen atom and a reactive olefinic functionality connected to the hydrophilic, hydrophobic and/or oleophobic group(s). Alternatively, the linkage between the nitrogen and the hydrophilic, hydrophobic and/or oleophobic groups may be achieved by a reaction of the amino nitrogen with an isocyanate functionality connected to the hydrophilic, hydrophobic and/or oleophobic groups. In another preferred embodiment, X can also be a polymeric carbon backbone such as the carbon backbone of a polyacrylate. It is also contemplated that a hydrophilic, hydrophobic and/or oleophobic group can be connected through another oleophobic, hydrophobic or hydrophilic moiety. For example, the hydrophobic moiety can be connected to X or indirectly through the hydrophilic moiety.

$R_1$ and $R_4$ are groups having hydrophilic properties comprising functional groups containing heteroatoms such as oxygen, nitrogen or sulfur. These functional groups typically comprise: —$CO_2H$, —$CO^-_2$, —$SO_3H$, —$SO^-_3$, or —OH. Other hydrophilic groups include polyalkylene oxide groups such as polyethylene oxide, protonated amines and quaternary compounds. These hydrophilic groups can be introduced into the silane compound by utilizing a precursor which contains a reactive olefinic functionality. Examples of suitable monomers include acrylic acid or other unsaturated carboxylic acids; sulfonated monomers such as 2-acrylamide-2-methyl propane sulfonic acid and its salts (commercially available as AMPS from Lubrizol Corp.); 3-sulfopropyl acrylate salts (commercially available from Aldrich Chem.); and acrylic monomers containing polyalkylene oxide groups such as polyethylene glycol (400) diacrylate (Sartomer 344 available from Sartomer). Alternatively, the hydrophilic group may be introduced as an isocyanate functional moiety such as the reaction product of 1000 molecular weight polyethylene glycol with toluene diisocyanate to produce a diisocyanate functional hydrophilic moiety which can be attached in like manner.

$R_2$ and $R_5$ are groups containing at least one hydrophobic functionality and comprise an aromatic or aliphatic moiety. Representative examples of aromatic moieties include phenyl, benzyl, and alkyl benzyl moieties. Preferably, the hydrophobic groups comprise an aliphatic group comprising four or more carbon atoms. Generally, carbon chains of 50 carbons or less are most useful although upper limits are set by workable viscosities. By a workable viscosity, it is understood that the compound or the dispersion should exhibit a sufficiently low viscosity, so that it can be coated onto and penetrate into a porous substrate. These functional groups can be introduced into the compounds of the invention through the use of precursors such as isooctyl acrylate, octadecyl acrylate, hexamethylene diisocyanate or higher molecular weight diisocyanates such as "DDI" 1410, a $C_{36}$ diisocyanate available from Henkel Corp.

$R_3$ and $R_6$ are groups containing at least one oleophobic functionality. Suitable oleophobic compounds include a class of fluoroaliphatic group represented by the following formula:

$R_f$—Q—

$R_f$ is a fluoroaliphatic group which contains from 3 to about 20 carbon atoms, and most preferably from about 6 to about 14 carbon atoms. The perfluorinated group can contain straight chain, branched chain or cyclic alkylene groups or combinations thereof. The perfluorinated alkyl group can, optionally, contain catenary hetero atoms such as oxygen, nitrogen, divalent or hexavalent sulfur. It is preferred that the perfluorinated alkyl group contain from about 40% to about 78% fluorine by weight and more preferably from about 50% to about 78% fluorine by weight. The terminal portion of the perfluorinated alkyl group should comprise at least 7 fluorine atoms, e.g. $CF_3CF_2CF_2$—, $(CF_3)_2CF$—, —$CF_2SF_5$, or the like. Perfluorinated aliphatic groups (i.e., those of the formula $C_nF_{2n+1}$) are the most preferred embodiments of the perfluorinated alkyl moieties.

Q is a linking group, or a covalent bond, which provides a means to link $R_f$ with the connecting group X or a hydrophilic or hydrophobic group. The linking group Q, can comprise a hetero atom-containing group, e.g., a group containing —S—, —O—, and or —NR—, or a combination of such groups, for example, —CO—, —CONR—, $SO_2$—, —$SO_2$—N($CH_3$)—, —$C_3H_6Cl$—, —CONR—, $SO_2$—, —$SO_2N(CH_3)$—, —$OC_2H_4$—, —$C_nH_{2n}$— where n is 1 to 6.

In addition, the perfluorinated alkyl moiety can be connected to X by using monomers such as ethyl perfluoro octyl sulfonamido ethyl acrylate prepared as described Example 3 of U.S. Pat. No. 2,803,615 which is herein incorporated by reference except that acrylic acid was used instead of methacrylic acid. Another useful monomer is the reaction product of perfluorooctyl sulfonyl fluoride prepared as described in Example 5 of U.S. Pat. No. 2,732,398, which is herein incorporated by reference, that can react with an amine functional connecting group, such as where X equals a primary or secondary amine. Another way of incorporating the oleophobic group into the compounds of the invention is to react an isocyanate-functional fluorine-containing moiety with a connecting group containing a primary or secondary amine or an alcohol functional group. An example of this alternative is the reaction of N-ethyl-N-2-hydroxyethyl perfluoro octane sulfonamide, the preparation of which is described in Example 3 of U.S. Pat. No. 2,803,656, with toluene diisocyanate to form an isocyanate-functional monomer.

Other oleophobic groups suitable for use in the materials of the present invention include oligomers of tetrafluoroethylene and hexafluoropropene disclosed in U.S. Pat. No. 2,918,501 incorporated herein by reference, which through additional chemical reactions, can be modified to produce silane functional materials.

Z is a hydrogen, hydroxy group or any group readily hydrolyzable to a hydroxy functionality. For example, Z may be a halogen, or $OR_9$ wherein $R_9$ is hydrogen, a lower aliphatic group, silane or silicon atom.

Y is a connective group which can comprise an oxygen or a compound having the formula:

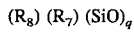

$(R_8)(R_7)(SiO)_q$ where q is 0, 1, 2, ... and $R_7$ and $R_8$ are hydrogen, hydroxyl, lower alkyl groups such as methyl, ethyl, propyl and butyl groups, fluorinated lower alkyl groups or aromatic groups.

The amounts of the hydrophilic, hydrophobic and oleophobic moieties depend on the nature of those moieties. For example, sulfonic acid salts are more hydrophilic than polyethylene glycol moieties and therefore less sulfonic acid salt will be required than for the polyethylene glycols. Similarly, methyl groups are less hydrophobic than octyl groups and therefore substantially more methyl groups are required to balance the properties.

To maximize the protective and cleanability properties on porous substrates while maintaining the advantage of an aqueous delivery system, it is essential that the compound of the present invention contain at least one hydrophilic, one hydrophobic and one oleophobic group. While all three groups can be present on one portion of the molecule (i.e., the connective group X), oil and water repellency properties can also be achieved with the various functional groups being distributed over other portions of the molecule (i.e., attached to the pendent group Y). Additionally, the presence of two or more functional groups of a particular type does not adversely impact upon the repellency and cleanability properties, and is frequently desired, to achieve optimal oil and water repellency properties.

The organosilane compounds of the present invention can be made in a variety of ways. However, it is preferred to prepare them through a Michael addition reaction between an aminoalkyl alkoxy silane and a reactive olefinic functionality connected to the hydrophilic, hydrophobic and/or oleophobic groups. If desired, the mixture can either be further reacted with isocyanates to produce an oligomeric material having hydrophilic, hydrophobic and oleophobic containing groups or it can be dispersed in water prior to the oligomerization process.

The compounds of the present invention can be delivered as a neat material, diluted with a solvent, or preferably as an aqueous dispersion. If a solvent(s) is used as a vehicle to deliver the compounds of the present invention, the solvent(s) can be used alone or in conjunction with water. Suitable solvents include alcohols, ketones, esters, hydrocarbons and the like. When used in conjunction with water, the solvents are preferably water miscible. If the compounds are delivered as an aqueous dispersion or if they are diluted with a solvent, the amount of each compound and delivery vehicle can vary over a broad range and can be selected to provide the desired protection and cleanability on the treated porous substrate. In general, it is preferred that the dispersion should comprise from about 1 to about 40 percent by weight compound and from about 60 to about 99 percent by weight of the water and solvent.

Porous substrates are treated with the compounds of the present invention by applying sufficient amounts of the compounds to the substrate to produce the desired cleanability and repellency properties. Preferably, the compounds are applied as a 20% solids dispersion at a coverage rate of 0.025 l/m² (1 gallon per 125 square feet). Once applied, the compounds are allowed to penetrate the porous substrate. The water or solvent is allowed to evaporate and the compound is allowed to react, at least in part, on, with, and/or within the porous substrate.

If desired, distinct precursors having oleophobic functionality, hydrophobic functionality and the hydrophilic functionality can be applied to the porous substrate and allowed to condense in situ to form the compound of the present invention. If condensation is partial, the compound will necessarily coexist with any unreacted precursors.

TEST METHODS

Oil Repellency

The oil repellency of treated test cubes is measured by applying a drop of mineral oil (50–200 centipoise viscosity) and/or motor oil (S.A.E. 30 weight) to the surface of treated concrete and/or mortar cubes while measuring the contact angle and observing the beading or spreading of the drop. The oil drop is allowed to remain on the masonry surface for 5 minutes, after which it is removed from the surface by blotting with a paper towel. The surface is subsequently examined for any indication of staining or discoloration. A scale of 0–5 is used to provide a subjective rating of the treated cube. Higher numbers indicate better oil repellency. 0 indicates complete wetting of the test cube surface and substantial staining or discoloration and 5 indicates beading of the oil drop and no significant staining or discoloration. In general, an oil repellency of 4 or higher is desired.

Oil Cleanability

Oil cleanability is the ability to remove oily stains or discoloration from a treated masonry surface. It is measured by placing a masonry test cube which had been previously treated with a repelling compound and allowed to cure for seven days at ambient conditions, in approximately ⅛ inch of used diesel oil (Pennzoil™ S.A.E. 30 used for approximately 2000 miles in a General Motors 5.7 liter V8 diesel engine) for a period of 24 hours. The stained test cube is then cleaned with a commercially available masonry degreaser (such as Titan-oil Flow, available from Titan Chem., Inc., Sunnyvale, Calif.) according to the manufacturer's directions and allowed to dry. Each test cube was subjected to a series of four staining/degreasing cycles with a three day drying period between each cycle. The degree of discolorization is rated on a subjective scale of 0–5. 0 indicates severe staining and 5 indicates no discoloration. In general, an oil cleanability rating of 4 or higher is desired.

Water and Salt Barrier Properties

The water and salt barrier properties of treated test cubes are evaluated according to the test identified as Test NCHRP 244 Test and described in the National Cooperative Highway Commission (NCHRP) report #244, Series II, available from the Transportation Research Board National Academy of Sciences, 2101 Constitution Ave. N.W., Washington, D.C. 20418. The test provides a relative value of a treated sample's resistance to water and salt challenges.

The test is conducted by applying a repelling treatment to a test cube at the manufacturer's recommended rate and allowing the cube to cure at 24°±3° C. (75°±5° F.) and 50±3% relative humidity for seven days. The treated cubes are then soaked in a 15% (wt/wt.) sodium chloride solution with periodic weighings.

Performance is calculated utilizing the equation:

$$\text{Percent Reduction} = 100(1 - \Delta\text{test cube}/\Delta\text{std. cube})$$

where;

$\Delta$test cube=percent weight gain of test cube, and
$\Delta$std. cube=percent weight gain of untreated control cube.

Higher numbers indicate better repellency and represent a treated cube's reduction in water pickup as compared to uncoated control cubes. A difference of about 5 percentage points generally represents a significant performance difference. Generally, a number of 70 or greater is desired.

Penetration depths are determined by splitting a sealed, cured cube and measuring the dry edge width after wetting the split face. A water repellent penetration of 0.16 cm for the cubes described below is desirable.

Paint Cleanability Properties

Paint cleanability is a measure of the ability of a repelling agent to protect a surface from paint. The paint cleanability properties are evaluated by treating test cubes which are partially masked with 3M Brand Masking Tape are treated with a repelling agent. Next, Krylon™ flat black spray paint is sprayed on the unmasked portion and allowed to dry for 24 hours. 3M Brand Magic Tape is then applied to the painted surface and removed with a rapid even motion. The test cubes are then visually inspected for residual paint and compared to untreated test cubes tested in the same manner.

Test Samples

The concrete and mortar cubes (2"×2"×2") test samples were prepared from the mix shown in Table 1:

TABLE 1

| | Concrete Mix (lbs./yd$^3$) | Mortar Mix (% by wt.) | Description |
|---|---|---|---|
| Cement | 564 | 1 | Regular Type I Portland Cement (ASTM:C150) |
| Admixture | 5.0 oz | — | Air-Entraining Agent, (ASTM:C260) |
| Fine Aggregate | 1,210 | 2.744 | Sand, (ASTM:C33) |
| Coarse Aggregate (¾"-#4) | 1,850 | — | Gravel, (ASTM:C33) |
| Water | 265 | 0.547 | |
| Water/Cement Ratio | 0.47 | — | |
| Air Content (calc) | 6% | — | |

Once mixed, the test cubes were moisture-cured for 28 days with the compressive strength of the cubes being monitored at 7 and 28 days. The measured compressive strength after 7 and 28 days is reported below in Table 2.

TABLE 2

| | Compressive Strength (psi) | |
|---|---|---|
| | Concrete Mix | Mortar Mix |
| 7 Days | 3,380 | 4,060 |
| 28 Days | 4,580 | 4,820 |

Subsequent to the 28 day cure and prior to being treated with a sealer, the test cubes were lightly sandblasted to remove loose, flaky particulate materials.

EXAMPLE 1

Adduct 1

An adduct which was a Michael reaction product of a hydrophobic group, isooctyl acrylate (IOA), and a connecting group, aminopropyl triethoxy silane (APS), was prepared by stirring a homogeneous mixture of IOA (890 gms., 5.2 moles), and APS (1000 gms., 4.5 moles, available from Union Carbide, Danbury, Conn.) at room temperature for approximately 48 hours.

Adduct 2

An adduct which was a Michael reaction product of a hydrophilic containing group, polyethylene glycol diacrylate (PEGDA) and a connecting group, aminopropyl triethoxy silane (APS), was prepared by stirring a homogeneous mixture of PEGDA (1025 gms., 2.0 moles, Sartomer 344, available from Sartomer Co., West Chester, Pa.) and APS (892 gms., 4.03 moles) at room temperature for approximately 48 hours.

Adduct 3

A partial perfluoro sulfonyl ester of the PEGDA/APS Michael addition product which contained an oleophobic group was prepared by adding perfluorooctyl sulfonyl chloride, the oleophobic group, (150 gms., 0.28 mole, prepared according to U.S. Pat. No. 3,427,336) to Adduct 2 (150 gms., 0.16 mole, 0.32 eq.) in isooctyl trimethoxy silane (300 gms., VP 1316, available from Wacker Chemical, Adrian, Mich.) under a $N_2$ atmosphere. The reaction was cooled in an ice bath and the sulfonyl chloride added over a period of approximately 10 minutes with vigorous stirring. On completion of the sulfonyl chloride addition the reaction mixture was allowed to warm to room temperature and stirred, under a $N_2$ atmosphere, for approximately 16 hours.

Premix 1

Adduct 1 (35 gms., 0.09 moles) and Adduct 3 (50 gms.) in isooctyl trimethoxy silane (50 gms.) were mixed to produce a premix (Premix 1) comprising a mixture of alkoxy silane-functional moieties containing hydrophilic, hydrophobic and oleophobic functional groups. Premix 1 was dispersed in water prior to application to siliceous surfaces. Alternatively, the Premix 1 can be further reacted to produce an oligomeric material containing hydrophilic, hydrophobic and oleophobic functional groups.

Adduct 4

An oligomeric silane adduct (Adduct 4) containing hydrophilic, hydrophobic and oleophobic functional groups lightly cross-linked by polyurea linkages was prepared by adding hexamethylene diisocyanate (5.0 gms., 0.03 moles, available from Mobay Corporation, Pittsburgh, Pa.) to Premix 1 (67.5 gms.) and vigorously stirring the reaction mixture for 24 hours at ambient conditions.

Dispersion 1a

Twenty gms. of Premix 1 were added to water (80 gms.) with mild agitation to produce a dispersion (Dispersion 1a, 20% solids) which maintained its stability for several hours without additional agitation. The dispersion was applied to the test cubes at a coverage rate of 0.025 $m^2$/l (125 $ft^2$/gal) and allowed to cure at room temperature for approximately seven days, after which the cubes were evaluated for oil and water repellency properties as well as cleanability performance. The test results are reported in Table 3.

Dispersion 1b

Twenty gms. of Adduct 4 were added to water (80 gms.) with mild agitation to produce an dispersion (Dispersion 1b, 20% solids) which maintained its stability for several hours without additional agitation. The dispersion was applied to concrete and mortar test cubes at a coverage rate of 0.025 $m^2$/l (125 $ft^2$/gal) and allowed to cure at room temperature for approximately seven days, after which the cubes were evaluated for oil and water repellency properties, paint protection and cleanability performance. The test results are reported in Tables 3 and 4.

EXAMPLE 2

Adduct 5

An adduct which was a Michael addition product of N-ethyl perfluoro octyl sulfonamide acrylate, the oleophobic containing group (NEPOSA, available from 3M, St. Paul, Minn. as FX-13) and aminopropyl triethoxy silane, the connecting group (APS), was prepared by stirring a homogeneous mixture of NEPOSA (250 gms., 0.4 moles), and APS (88 gms., 0.4 moles) at room temperature for approximately 48 hours.

Premix 2

A mixture of silane-functional moieties containing hydrophilic, hydrophobic and oleophobic functional groups consisting of Adduct 5 (35 gms., 0.04 moles), Adduct 1 (50 gms., 0.13 moles) and Adduct 2 (35 gms., 0.05 moles) in isooctyl trimethoxy silane (50 gms.) was stirred for approximately 3 hours at ambient temperatures to produce a premix (Premix 2).

Adduct 6

An oligomeric silane adduct (Adduct 6) containing hydrophilic, hydrophobic and oleophobic functional groups lightly cross-linked by polyurea linkages was prepared by adding hexamethylene diisocyanate (5.0 gms., 0.03 moles, available from Mobay Corporation, Pittsburgh, Pa.) to Premix 2 (77.5 gms.) and vigorously stirring the reaction mixture for 24 hours at ambient conditions.

Dispersion 2a

Premix 2 (20.0 gms.) was added to water (80 gms.) with mild agitation to produce a dispersion (Dispersion 2a) which maintained its stability for several hours without additional agitation. The dispersion was applied to concrete and mortar test cubes at a coverage rate of 0.025 $m^2$/l (125 $ft^2$/gal) and allowed to cure at room temperature for approximately seven days, after which the cubes were evaluated for oil and water repellency properties and cleanability performance. The test results are reported in Table 3.

Dispersion 2b

Adduct 6 (20 gms.) was added to water (80 gms.) with mild agitation to produce a dispersion which maintained its stability for several hours without additional agitation. The dispersion was applied to concrete and mortar test cubes at a coverage rate of 0.025 $m^2$/l (125 $ft^2$/gal) and allowed to cure at room temperature for approximately seven days, after which the cubes were evaluated for oil and water repellency properties and cleanability performance. The test results are reported in Table 3.

Comparative Example 1

This example examined the ability of the individual adducts of Example 2, when used independently or in combination with just one other adduct, to produce oil and water repellency properties and to provide adequate cleanability performance.

Comparative Example 1a

Adduct 5 (20 gms.) was diluted with ethyl alcohol (80 gms.), the resulting solution applied to concrete and mortar cubes at a coverage rate of 0.025 $m^2$/l (125 $ft^2$/gal) and allowed to cure at room temperature for approximately seven days, after which the cubes were evaluated for oil and water repellency properties and cleanability performance as previously described.

The compound which contained only oleophobic groups, displayed some oil repellency properties, but showed minimal water barrier properties and poor cleanability.

Comparative Example 1b

A premix (Premix 3) containing a mixture of silane or alkoxy silane functional moieties having hydrophobic and oleophobic functional groups consisting of Adduct 5 (35 gms., 0.047 moles), Adduct 1 (50 gms., 0.13 moles) and isooctyl trimethoxy silane (50 gms.) was prepared by stirring the mixture for approximately 3 hours at ambient temperatures. A dispersion could not be prepared from this premix because it lacked a hydrophilic functional group, so 20 gms. of the premix was diluted with ethyl alcohol, the solution applied to concrete cubes at a coverage rate of 0.025 $m^2$/l (125 $ft^2$/gal) and allowed to cure at room temperature for approximately seven days, after which the cubes were evaluated for oil and water repellency properties and cleanability performance as previously described. Treated samples failed the cleanability test.

Comparative Example 1c

A premix (Premix 4) containing a mixture of silane or alkoxy silane functional moieties having hydrophilic and oleophobic functional groups consisting of Adduct 2 (25 gms.) and Adduct 3 (25 gms.) was prepared by stirring the mixture for approximately 3 hours at ambient temperatures. Twenty grams of the resulting premix were added to water (80 gms.) with vigorous agitation to produce a dispersion (20% solids) which was applied to concrete cubes at a coverage rate of 0.025 m²/l (125 ft²/gal). The cubes were evaluated for oil and water repellency properties and cleanability performance after curing at room temperature for approximately seven days. The water repellency properties were low for the test cubes.

Comparative Example 1d

A premix (Premix 5) containing a mixture of alkoxy silane functional moieties having hydrophilic and oleophobic functional groups consisting of Adduct 2 (25 gms.) and Adduct 5 (25 gms.) was prepared by stirring the mixture for approximately 3 hours at ambient temperatures and tested as described in Example 1c. The water repellency properties were low for the test cubes.

Comparative Example 1e

A conventional silane treatment composition which contained hydrophobic functional groups was prepared in the following manner. A 20% solids solution of isooctyl trimethoxy silane in mineral spirits was applied to concrete and mortar test cubes at a coverage rate of 0.025 m²/l (125 ft²/gal) and allowed to cure at room temperature for approximately seven days, after which the cubes were evaluated for oil and water repellency properties, paint protection and cleanability performance. The test results reported in Tables 3 and 4 indicate that the oil repellency, paint protection and cleanability are unsatisfactory.

EXAMPLE 3

A silane terpolymer containing hydrophilic, hydrophobic and oleophobic functional groups was prepared by the free radical polymerization of acrylic acid, trimethoxysilylpropyl methacrylate, 2-methyl hexyl methacrylate, and N-ethyl perfluorooctyl sulfonamide acrylate. Thus, a mixture of toluene (30 gms.), isopropanol (30 gms.), mercapto acetic acid (1.5 gms.), azobisisobutyronitrile (0.6 gms.), acrylic acid (5.0 gms. 0.07 moles), trimethoxysilylpropyl methacrylate (10.0 gms., 0.04 moles), 2-ethylhexyl methacrylate (25.0 gms., 0.14 moles, available from Aldrich Chemical Co.), and N-ethyl perfluorooctyl sulfonamide acrylate (5.0 gms., 0.01 moles) was heated at 60° C. (140° F.), with stirring and under a $N_2$ atmosphere, for approximately 16 hours. Solvents were removed from the reaction mixture using a rotary evaporator (Büchi, Model 121) and water aspirator vacuum to produce a viscous polymer oil. A stable dispersion of the polymer was prepared by mixing a portion of the terpolymer (10 gms.) with isooctyl trimethoxy silane (10 gms.) and adding the resulting mixture to water (79 gms.) containing NaOH (1.0 gm.) with vigorous agitation. The dispersion was applied to concrete and mortar test cubes at a coverage rate of 0.025 m²/l (125 ft²/gal) and allowed to cure at room temperature for approximately seven days, after which the cubes were evaluated for oil and water repellency properties and cleanability performance. The test results are reported in Table 3.

Comparative Example 2

A sample of a silane compound which contained hydrophobic and hydrophilic functional groups was prepared in the following manner. A mixture of alkoxy silane functional moieties containing hydrophilic, and hydrophobic functional groups consisting of Adduct 1 (35 gms., 0.09 moles) and Adduct 2 (50 gms., 0.05 moles) in isooctyl trimethoxy silane (50 gms.) was stirred under a $N_2$ atmosphere for approximately 12 hours at ambient temperatures. The resulting mixture was oligomerized by adding hexamethylene diisocyanate (5.0 gms., 0.03 moles) to the adduct and vigorously stirring the reaction mixture for hours at ambient conditions to produce an oligomer containing hydrophilic and hydrophobic functional groups lightly cross-linked by polyurea linkages.

A portion of the reaction mixture (20 gms.) was then added to water (80 gms.) along with agitation of sufficient intensity to produce a dispersion (20% solids) which maintained its stability for several hours without additional agitation. The dispersion was applied to concrete and mortar test cubes at a coverage rate of 0.025 m²/l (125 ft²/gal) and allowed to cure at room temperature for approximately seven days, after which the cubes were evaluated for oil and water repellency properties and cleanability performance.

TABLE 3

| Example | Water Repellency Days Immersed | | | | | Oil Repellency | Cleanibility |
|---|---|---|---|---|---|---|---|
| | 1 | 3 | 7 | 14 | 21 | | |
| 1a | 93 | 83 | 80 | 70 | 62 | 5 | 4 |
| 1b | 96 | 94 | 88 | 82 | 78 | 5 | 5 |
| 2a | 90 | 83 | 80 | 74 | 68 | 4 | 4 |
| 2b | 94 | 89 | 84 | 77 | 72 | 5 | 5 |
| 3 | 94 | 90 | 85 | 79 | 76 | 5 | 5 |
| Comp. 1e | 94 | 91 | 86 | 80 | 75 | 0 | 0 |
| Comp. 2 | 93 | 86 | 82 | 79 | 76 | 0 | 2 |

TABLE 4

| Example | Paint Cleanability |
|---|---|
| 1b | Residual paint deep in sample pores |
| Comp. 1e | No paint removed |
| Untreated Sample | No paint removed |

In general, cubes treated with the compounds of the present invention performed better than those not treated. Cubes treated with the compounds of the present invention exhibited good repellency properties, paint protection and oil and paint cleanability for both waterbased and oilbased challenges. Exclusion of hydrophobic moieties lowered the water repellency properties of treated cubes. Similarly, the exclusion of oleophobic moieties decreased the oil repellency properties of the treated cubes to 0. Moreover, compounds lacking hydrophilic and oleophobic functional groups did not protect treated substrates from paint challenges.

In summary, novel organosilane compounds which are capable of imparting repellent properties as well as enhancing cleanability properties of porous substrates have been described. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims including all equivalents.

We claim:

1. An organosilane compound comprising the formula:

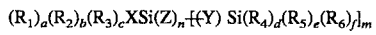

where:

$R_1$ is a group containing at least one hydrophilic functionality;

$R_2$ is a group containing at least one hydrophobic functionality;

$R_3$ is a group containing at least one oleophobic functionality;

$R_4$ is a group containing at least one hydrophilic functionality;

$R_5$ is a group containing at least one hydrophobic functionality;

$R_6$ is a group containing at least one oleophobic functionality;

X is a connective moiety;

Y is a second connective moiety

Z is H, OH or a moiety hydrolyzable to OH;

m and n are 0, 1, 2, or 3, m+n=3, and n is at least 1;

a is 0, 1, 2, or 3;

b is 0, 1, 2, or 3;

c is 0, 1, 2, or 3;

where m=0, a, b, c,$\geq 1$ where m$\geq 1$, d is 0, 1, 2 ...;

e is 0, 1, 2 ...;

f is 0, 1, 2 ...;

a+b+c+d+e+f$\geq 3$, where a+d=1 or more;

b+e=1 or more; and c+f=1 or more.

2. The compound of claim 1 wherein said X is selected from the group comprising an aliphatic group containing a multi-ligand hetero atom, an aliphatic group or an aromatic group.

3. The compound of claim 1 wherein said are selected from hydrophobic groups containing aliphatic or an aromatic group.

4. The compound of claim 1 wherein said $R_1$ are selected from a hydrophilic groups comprising hydrophilic groups containing oxygen, hydrophilic groups containing sulfur, hydrophilic groups containing nitrogen and combinations thereof.

5. The compound of claim 1 wherein said $R_3$ and $R_6$ are fluorinated aliphatic groups.

6. The compound of claim 1 wherein said Z is a halogen.

7. The compound of claim 1 wherein said Z is represented by the formula:

$OR_9$ wherein $R_9$ is selected from the group comprising a hydrogen, an aliphatic group, a silane or a silicone atom.

8. The compound of claim 1 wherein said Y is selected from a group comprising an oxygen or a siloxane, said siloxane comprising:

$(R_7)(R_8)(SiO)_q$ where q is 1, 2, ..., and wherein said $R_7$ and $R_8$ are selected from a group comprising a lower alkyl, fluorinated lower alkyl or aromatic group.

9. The compound of claim 2 wherein said X comprises at least one nitrogen containing aliphatic group.

10. The compound of claim 1 wherein said compound is derived from a mixture of reactive precursors.

11. The compound of claim 1 wherein said compound is derived from independently applied precursors.

12. An aqueous dispersion for treating porous substrates to repel water and oil based challenges and to provide oil cleanability comprising:

a. an organosilane comprising the formula:

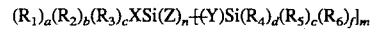

where:

$R_1$ is a group containing at least one hydrophilic functionality;

$R_2$ is a group containing at least one hydrophobic functionality;

$R_3$ is a group containing at least one oleophobic functionality;

$R_4$ is a group containing at least one hydrophilic functionality;

$R_5$ is a group containing at least one hydrophobic functionality;

$R_6$ is a group containing at least one oleophobic functionality;

X is a connective moiety;

Y is a second connective moiety

Z is H, OH or a moiety hydrolyzable to OH;

m and n are 0, 1, 2, or 3, m+n=3, and n is at least 1;

a is 0, 1, 2, or 3;

b is 0, 1, 2, or 3;

c is 0, 1, 2, or 3;

where m=0, a, b, c,$\geq 1$ where m$\geq 1$, d is 0, 1, 2 ...

e is 0, 1, 2 ...

f is 0, 1, 2 ...

a+b+c+d+e+f$\geq 3$, where a+d=1 or more;

b+e=1 or more;

c+f=1 or more; and b. water.

13. The dispersion of claim 12 wherein said X is selected from the group comprising an aliphatic group containing a multi-ligand hetero atom, an al or an aromatic group.

14. The dispersion of claim 12 wherein said are selected from hydrophobic groups containing an aliphatic or an aromatic group.

15. The dispersion of claim 12 wherein said $R_1$ an are selected from a hydrophilic groups comprising hydrophilic groups containing oxygen, hydrophilic groups containing sulfur, hydrophilic groups containing nitrogen and combinations thereof.

16. The dispersion of claim 12 wherein said $R_3$ and $R_6$ are fluorinated aliphatic groups.

17. The dispersion of claim 12 wherein said Z is a halogen.

18. The dispersion of claim 12 wherein said Z is represented by the formula:

$OR_9$ wherein $R_9$ is selected from the group comprising a hydrogen, an aliphatic group, a silane or a silicone atom.

19. The dispersion of claim 12 wherein said Y is selected from a group comprising an oxygen or a siloxane, said siloxane comprising:

$$(R_7)(R_8)(SiO)_q$$

where q is 1,2, . . . , and wherein said $R_7$ and $R_8$ are selected from a group comprising a lower alkyl, fluorinated lower alkyl or aromatic group.

20. The dispersion of claim 13 wherein said X comprises at least one nitrogen containing aliphatic group.

21. The dispersion of claim 12 wherein said compound is derived from a mixture of reactive precursors.

22. The dispersion of claim 12 wherein said compound is derived from independently applied precursors.

* * * * *

UNITED STATES PATENT AND TRADEMARK OFFICE
CERTIFICATE OF CORRECTION

PATENT NO.: 5,527,931
DATED: June 18, 1996
INVENTOR(S): Larry D. Rich and James F. Sanders It is certified that error appears in the above-identified patent and that said Letters Patent is hereby corrected as shown below:

Col. 12, line 8     after "for" insert --24--

Col. 13, line 41     after "said" insert --$R_2$ and $R_5$--

Col. 13, line 44     after "$R_1$" insert --and $R_4$--

Col. 14, line 13     "$(R_1)_a(R_2)_b(R_3)_cXSi(Z)_n[(Y)Si(R_4)_d(R_5)_c(R_6)_f]_m$" should read --$(R_1)_a(R_2)_b(R_3)_cXSi(Z)_n[(Y)Si(R_4)_d(R_5)_e(R_6)_f]_m$--

Col. 14, line 37     "d is 0, 1, 2 . . ." should read --d is 0, 1, 2 . . .;--

Col. 14, line 38     "e is 0, 1, 2 . . ." should read --e is 0, 1, 2 . . .;--

Col. 14, line 39     "f is 0, 1, 2 . . ." should read --f is 0, 1, 2 . . .;--

Col. 14, line 47     "al" should read --aliphatic group--

Col. 14, line 48     after "said" insert --$R_2$ and $R_5$--

Col. 14, line 51     "an" should read -- and $R_4$--.

Signed and Sealed this

Ninth Day of December, 1997

Attest:

BRUCE LEHMAN

*Attesting Officer*     *Commissioner of Patents and Trademarks*